United States Patent [19]

Free et al.

[11] Patent Number: 5,755,101

[45] Date of Patent: May 26, 1998

[54] ELECTRONIC TURBOCHARGER WASTEGATE CONTROLLER

[75] Inventors: Paul Douglas Free; Spencer C. Lewis, Jr., both of Columbus; Canden R. Nelson, North Vernon, all of Ind.

[73] Assignee: Cummins Engine Company, Inc., Columbus, Ind.

[21] Appl. No.: 622,990

[22] Filed: Mar. 28, 1996

[51] Int. Cl.⁶ ........................................ F02B 37/12
[52] U.S. Cl. ........................................ 60/602
[58] Field of Search ................ 60/600, 601, 602, 60/603

[56] References Cited

U.S. PATENT DOCUMENTS

| | | |
|---|---|---|
| 1,051,350 | 1/1913 | Nogier . |
| 3,308,846 | 3/1967 | Yuile . |
| 3,454,046 | 7/1969 | Lanctot et al. . |
| 4,197,711 | 4/1980 | Fuhrmann et al. ........... 60/602 |
| 4,404,804 | 9/1983 | Tadokoro et al. . |
| 4,461,149 | 7/1984 | Suzuki ........................ 60/602 |
| 4,483,146 | 11/1984 | Morikawa . |
| 4,736,589 | 4/1988 | Iwasa . |
| 4,763,475 | 8/1988 | Toshio et al. ............... 60/602 |
| 4,816,083 | 3/1989 | Bangyan . |
| 4,893,646 | 1/1990 | Wimmer . |
| 5,090,202 | 2/1992 | Hitomi et al. .............. 60/602 |
| 5,186,093 | 2/1993 | Kervagoret . |
| 5,195,323 | 3/1993 | Lorts . |
| 5,197,287 | 3/1993 | Okimoto et al. . |
| 5,386,698 | 2/1995 | Kamel . |

FOREIGN PATENT DOCUMENTS

| | | |
|---|---|---|
| 58-197429 | 11/1983 | Japan . |
| 60-230514 | 11/1985 | Japan ........................ 60/602 |
| 60-243347 | 12/1985 | Japan ........................ 60/602 |

Primary Examiner—Michael Koczo
Attorney, Agent, or Firm—Woodard, Emhardt, Naughton, Moriarty & McNett

[57] ABSTRACT

A turbocharger wastegate control system is responsive to electrical control signals to control the position of a wastegate valve positioned within an exhaust bypass conduit of the turbocharger. In one embodiment, the control system includes an air pressure control device having an inlet port receiving boost air pressure from an intake manifold connected to the turbocharger, an outlet port providing wastegate air pressure to a wastegate actuator and a vent to atmosphere. A number of air flow control switches are responsive to electrical control signals to control the levels of boost air pressure and vented air to thereby provide a plurality of discrete wastegate air pressure levels to the wastegate actuator. In another embodiment, the control system includes an electrically controllable wastegate actuator responsive to boost air pressure and electrical control signals to modulate the position of the wastegate actuator plunger.

18 Claims, 6 Drawing Sheets

ELECTRONIC TURBOCHARGER WASTEGATE CONTROLLER

FIELD OF THE INVENTION

The present invention relates generally to systems for controlling an internal combustion engine having a turbocharger, and more specifically to such systems for controlling turbocharging pressure.

BACKGROUND OF THE INVENTION

Turbocharged internal combustion engines are commonplace in the automotive and heavy-duty truck industries. Typical turbochargers utilize exhaust gas energy to supercharge intake air to the internal combustion engine. Such supercharging has the dual effect of increasing the intake air charging efficiency and increasing the amount of fuel injection, both of which effects result in increased engine output.

A common problem associated with exhaust gas turbochargers is that the turbocharging system, as well as the internal combustion engine, may become damaged if the supercharging pressure is allowed to become excessive. As such, many turbocharging systems include an exhaust bypass conduit connecting the turbocharger exhaust inlet to the exhaust outlet. A so-called wastegate valve is typically disposed within the exhaust bypass conduit, and is modulated in accordance with the supercharging pressure supplied by the turbocharger compressor.

Referring now to FIG. 1, an example of a known internal combustion engine turbocharging system 10 is shown which includes an exhaust bypass conduit and associated wastegate mechanism. Turbocharger 12 is mechanically actuated by the flow of exhaust gases. Exhaust gases enter through the turbocharger exhaust gas inlet 14 and strike the turbine fan 16 causing it to rotate. The exhaust gases exit the turbocharger 12 through the turbocharger exhaust gas outlet 18. The rotational forces created by the exhaust gas flowing through turbine fan 16 are transferred via turbine drive shaft 20 to the turbocharger compressor wheel 22. The turbocharger compressor wheel 22 compresses the air from the fresh air inlet 24 and delivers the compressed air to the intake manifold 26.

The compressed air in intake manifold 26 is mixed with fuel supplied by a fuel source (not shown), and the mixture moves through intake manifold 26 to the combustion chamber 28 defined by the area of cylinder 35 above piston 30. The air-fuel mixture is delivered to combustion chamber 28 via intake port 32. The air-fuel mixture is then compressed and ignited as is known in the art.

After the combustion cycle, the exhaust gases are expelled through exhaust port 34 and enter the exhaust gas manifold 36. The exhaust gas manifold 36 is connected to the turbocharger exhaust gas inlet 14, such that exhaust gases may flow through the turbocharger fan 16. An exhaust bypass conduit 38 connects the turbocharger exhaust gas inlet 14 to the turbocharger exhaust gas outlet 18. The exhaust gas bypass conduit 38 serves to route at least a portion of the engine exhaust gas around the turbocharger 12, there-by decreasing the drive force on turbocharger 12, and correspondingly limiting the air pressure in intake manifold 26.

An exhaust gas bypass valve 40, typically referred to as a wastegate valve, is located within the exhaust bypass conduit 38. Wastegate valve 40 is controlled by wastegate valve actuator 42 in accordance with the air pressure in intake manifold 26, which is typically referred to as boost air pressure. Specifically, intake manifold outlet 26 has an orifice 54 connected to an input orifice 52 of wastegate valve actuator 42 via conduit 56. Wastegate valve actuator 42 includes a plunger 44 which is connected to wastegate valve 40 at one end, and to a pressure responsive member 46 at an opposite end. Pressure responsive member 46 is typically a flexible diaphragm. A spring 48 is positioned between flexible member 46 and the housing of wastegate valve actuator 42 and is in compression to thereby bias plunger 44 away from wastegate valve 40. When turbocharger 12 is inoperative, spring 48 biases plunger away from wastegate valve 40 sufficiently to cause wastegate valve 40 to close and thereby inhibit air flow through exhaust bypass conduit 38.

Input orifice 52 o f wastegate valve actuator 42 is in fluid communication with a chamber 50 defined by the housing of wastegate valve actuator 42 and flexible member 46. The portion of wastegate valve actuator 42 containing spring 48 is typically vented to atmosphere so that any pressure increase within chamber 50, corresponding to an increase in boost air pressure in intake manifold 26, forces pressure sensitive member 46 toward spring 48. As the pressure within chamber 50 increases sufficiently to overcome the biasing force of spring 48, plunger 44 moves toward wastegate valve 40, thereby slightly opening wastegate valve 40 and permitting a portion of the exhaust from exhaust gas manifold 36 to be diverted from exhaust inlet 14 and flow directly to exhaust gas outlet 18 via exhaust bypass conduit 38. If the turbocharger compressor wheel 22 causes the boost air pressure within intake manifold 26 to further increase, a correspondingly increased air pressure within chamber 50 of wastegate valve actuator 42 causes plunger 44 to open wastegate valve 40 further, thereby increasing the amount of exhaust gas bypassing turbocharger 12 into turbocharger exhaust gas outlet 18. As exhaust gas is directed into exhaust bypass conduit 38, the drive force to turbine fan 16 is correspondingly reduced, which causes a corresponding drop in boost pressure within intake manifold 26, and thus a drop in pressure within chamber 50 of wastegate valve actuator 42. The drop in pressure within chamber 50 permits the biasing force of spring 48 to move plunger 44 away from wastegate valve 40, thereby causing valve 40 to increasingly restrict exhaust flow through exhaust bypass conduit 38. In this manner, the position of wastegate valve 40 is modulated in order to regulate the boost air pressure within intake manifold inlet 26 provided by turbocharger compressor wheel 22.

Although the prior art wastegate mechanism shown and described with respective FIG. 1 has proven effective in regulating the boost air pressure supplied by turbocharger compressor wheel 22 to intake manifold 26, designers of such systems have attempted to exercise further control over the operation of wastegate valve 40. For example, U.S. Pat. No. 4,483,146 to Morikawa discloses a pressure control mechanism operable to alter the boost air pressure provided to the wastegate valve actuator in accordance with cylinder pressure to thereby ensure consistent turbocharger performance regardless of changes in atmospheric pressure due to attitudinal changes. Specifically, Morikawa inhibits boost air pressure from reaching the wastegate valve actuator until cylinder pressure increases above a predetermined level. Thereafter, a control circuit intermittently opens and closes a boost air pressure valve in accordance with a predefined duty cycle provided by a look up table, which then causes the wastegate valve to be likewise intermittently opened and closed by the wastegate valve actuator at the same duty cycle.

Although the Morikawa reference appears to solve a problem associated with inconsistent turbocharger operation at different atmospheric pressures, the pressure control mechanism for altering air pressure to the wastegate valve actuator suffers from several drawbacks. First, the pressure control solenoid in its unenergized state inhibits the flow of boost air to the wastegate valve actuator. Thus, in the event that the electronic pressure control mechanism fails, the Morikawa device does not appear to provide for exhaust bypass flow. As previously discussed, such a condition could result in excessive supercharging pressure and lead to turbocharger and/or engine damage. Secondly, the Morikawa system requires the electronically controlled pressure valve, as well as the wastegate valve actuator and wastegate valve itself, to be rapidly, and continuously, actuated and deactuated. Continuous operation of such a nature tends to result in premature mechanical fatigue and component failure, thereby resulting in frequent maintenance activities and an inherently unreliable system. What is therefore needed is a simple and reliable pressure control mechanism for providing enhanced control over the operation of the wastegate valve which permits standard exhaust bypass operation, as discussed with respective FIG. 1, as a default condition thereof.

SUMMARY OF THE INVENTION

Many of the shortcomings of the known turbocharger wastegate control systems described in the BACKGROUND section are addressed by the present invention. The present invention is directed to an internal combustion engine having a turbocharger system with an exhaust inlet, an exhaust outlet and an intake manifold providing supercharging intake air flow to the internal combustion engine. An exhaust bypass conduit is connected between the exhaust inlet and the exhaust outlet of the turbocharger, and is operable to divert exhaust air flow from the exhaust inlet to the exhaust outlet as described in the BACKGROUND section. To this end, a flow control member is positioned in the exhaust bypass conduit and is controllable by flow control actuator responsive to boost air pressure in the intake manifold to modulate air flow therethrough.

In accordance with one aspect of the present invention, an air pressure control device is positioned between the intake manifold connected to the turbocharger and the flow control actuator. The air pressure control device receives boost air pressure and provides any of a plurality of desired air pressure levels to the flow control actuator to thereby provide enhanced control over the flow control member positioned within the exhaust bypass conduit.

In one embodiment, the air pressure control device includes a boost air inlet port connected to the intake manifold of the turbocharger, an air pressure outlet port connected to the flow control actuator and a vent port to atmosphere. The air pressure outlet port is preferably in continuous flow communication with both the boost air inlet port and the vent port. A first air flow control switch is positioned between the boost air inlet port and the air pressure outlet port and is responsive to a first control signal to provide an additional air flow path therebetween. A second air flow switch is likewise positioned between the air pressure outlet port and the vent port and is responsive to a second control signal to provide an additional air flow path therebetween. In a preferred embodiment, the air pressure control device is thus controllable to provide any of four possible discrete air pressure levels to the flow control actuator.

In accordance with another aspect of the present invention, a vehicle control computer is responsive to a plurality of input data signals corresponding to vehicle operating parameters to provide the first and second control signals to the air pressure control device. Preferably, the input data signals permit the vehicle control computer to either ascertain, or estimate, turbocharger exhaust intake temperature and turbocharger speed. The vehicle control computer, in turn, provides the first and second control signals in accordance therewith.

In accordance with yet another aspect of the present invention, the air pressure control device and flow control actuator are replaced by an electronically controllable flow control actuator. In one embodiment, the electronically controllable flow control actuator is identical in most respects to the flow control actuator described in the BACKGROUND section, with the addition of an electrically controllable coil disposed about an extension of the plunger which is formed of a magnetic material. The coil preferably has a pair of control signal inputs for receiving a differential control signal thereat. In response to the differential control signal, the plunger is either further extended, or is retracted, depending upon the polarity of the control signal. The electrically controllable flow control actuator is thus electrically controllable to provide an "effective" pressure control setting which is the actual pressure control setting due to boost air pressure ± the position of the plunger due to the magnetic interaction between the coil and plunger.

One object of the present invention is to provide for enhanced control over a turbocharger wastegate valve setting.

Another object of the present invention is to provide such enhanced control using an air pressure control device responsive to electrical control signals and to boost air pressure to provide any of a plurality of discrete air pressure levels to a wastegate actuator corresponding to a desired level of boost air pressure.

Yet another object of the present invention is to provide such enhanced control using an electrically controllable wastegate actuator responsive to electrical control signals and to boost air pressure to modulate the position of the wastegate actuator plunger.

Still another object of the present invention is to provide a vehicle control computer with a plurality of input data signals corresponding to vehicle operating parameters, wherein the vehicle control computer is operable to provide the electrical control signals to either the air pressure control device or electrically controllable wastegate actuator in accordance therewith.

These and other objects of the present invention will become more apparent from the following description of the preferred embodiments.

DESCRIPTION OF THE PREFERRED EMBODIMENT

Figure 1:
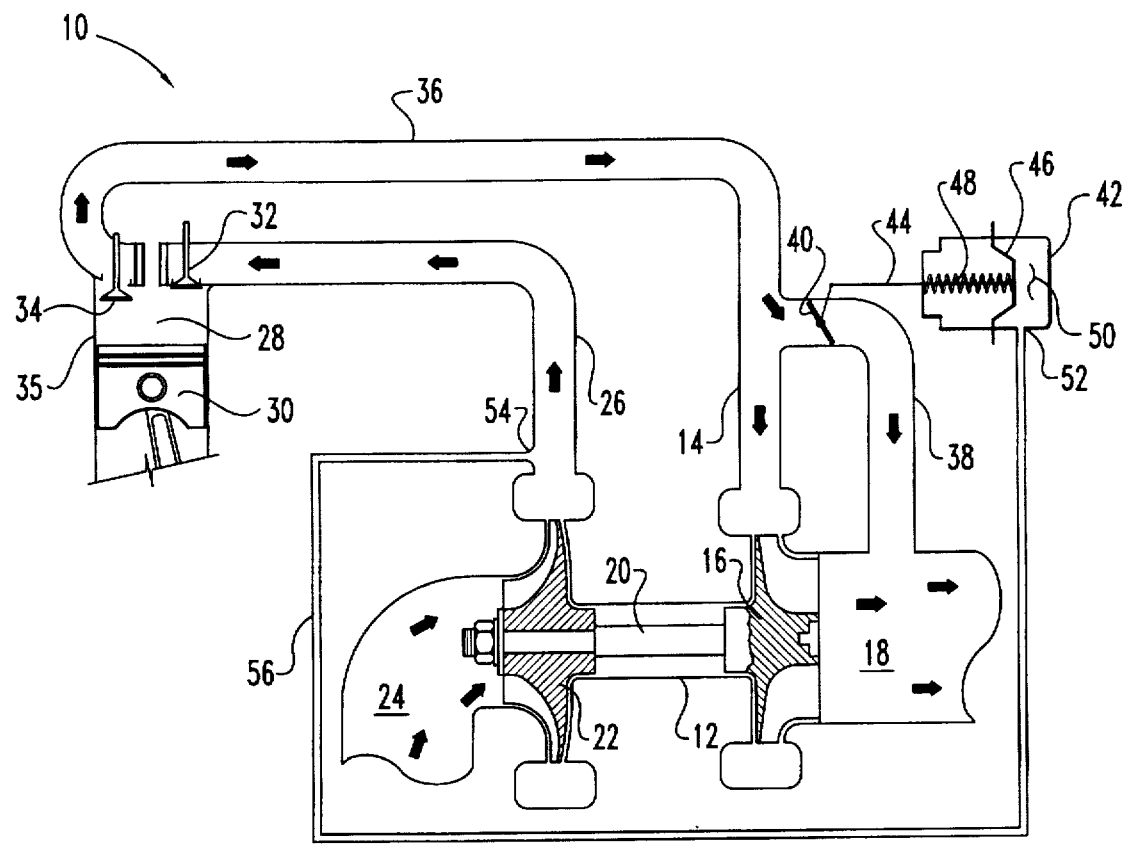
FIG. 1 is a diagrammatic illustration of an engine with a turbocharger and corresponding exhaust bypass flow arrangement as in known in the art.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
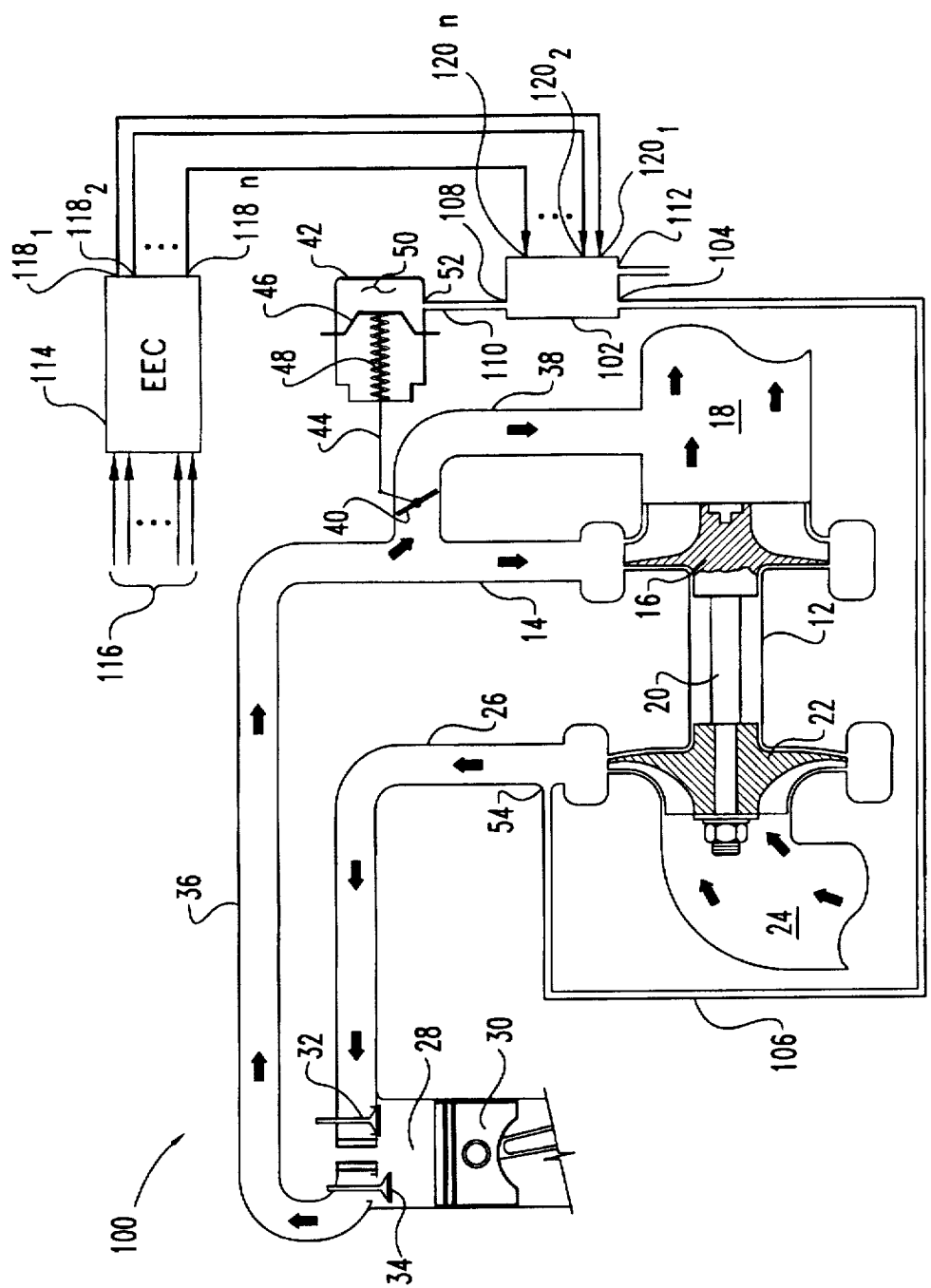
FIG. 2 is a diagrammatic illustration of an engine with a turbocharger and one embodiment of a corresponding bypass exhaust flow control system.

Referring now to FIG. 2, one preferred embodiment of an internal combustion engine turbocharging system 100, in accordance with one aspect of the present invention, is shown. System 100 is identical in many respects to the turbocharging system 10 illustrated in FIG. 1 and described in the BACKGROUND section, and like numbers are therefore used to identify like components. In addition to the components shown and described with respect to FIG. 1, system 100 further includes an air pressure control device 102 disposed between intake manifold 26 and wastegate valve actuator 42. Air pressure control device 102 has an inlet port 104 connected to orifice 54 via conduit 106 to thereby establish flow communication therebetween, and an outlet port 108 connected to input orifice 52 of wastegate actuator 42 via conduit 110 to thereby establish flow communication therebetween. Air pressure control device 102 further includes an unconnected vent port 112 which is in flow communication with the atmosphere surrounding device 102, the purpose of which will be more fully described hereinafter.

System 100 further includes an electronic engine computer 114 (EEC) which is preferably a microprocessor-based unit having ROM, RAM, analog I/O and digital I/O (not shown). EEC 114 is commonly referred to in the automotive industry as an engine control module (ECM), vehicle control computer (VCC), or the like, and typically controls multiple engine and vehicle operating conditions. EEC 114 has a plurality of inputs 116 thereto which are coupled to various vehicle operating condition monitors and sensors (not shown). EEC 114 receives important vehicle and engine operating condition data via inputs 116, as is known in the art, and as such data relates to the present invention, it preferably includes data either relating to the speed of turbocharger 12 and the temperature of exhaust gas entering inlet 14, or includes data from which turbocharger speed and inlet 14 temperature can be calculated or inferred.

EEC 114 further includes a number of electrical signal outputs $118_1$, $118_2$, ...., $118_n$ which are connected to corresponding electrical signal inputs $120_1$, $120_2$, ...., $120_n$ of air pressure control device 102. As will be discussed more fully hereinafter, EEC 114 provides electrical signals at outputs $118_1$ - $118_n$ in accordance with vehicle operating conditions to control the air pressure supplied by air pressure control device 102 to the wastegate actuator 42.

Figure 3:
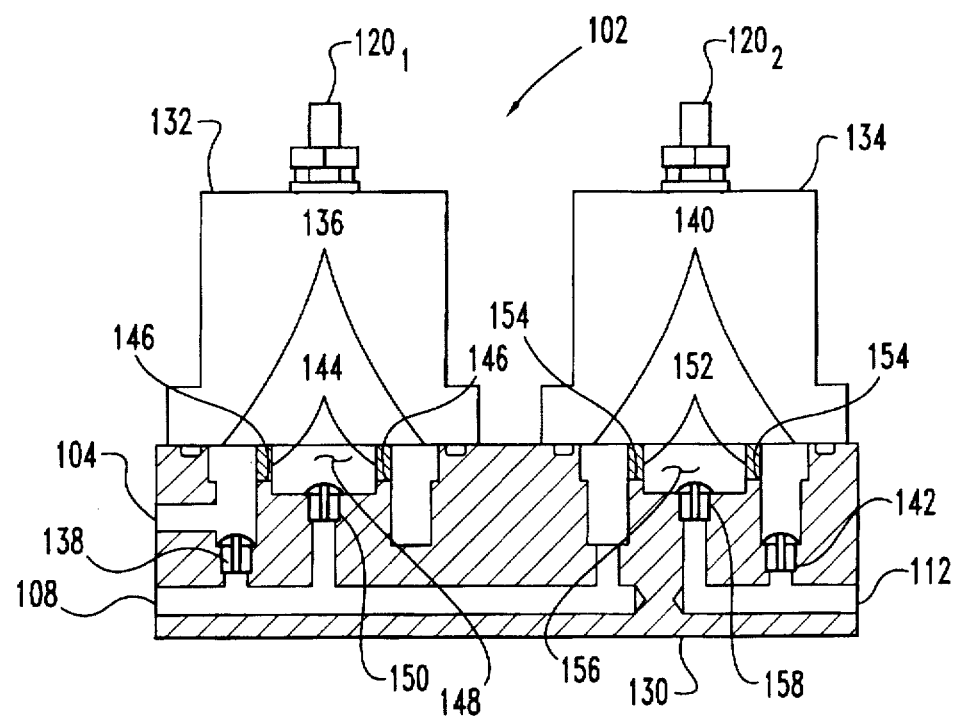
FIG. 3 is a cross-sectional view of one embodiment of an air flow control device for use in controlling air pressure provided to the wastegate actuator in the control system of FIG. 2.

Referring now to FIG. 3, a preferred embodiment of air pressure control device 102 is shown. Device 102 includes a body 130 defining a plurality of air passageways therethrough and a pair of electrically controlled air flow switches 132 and 134 having electrical signal inputs 120, and 1202 respectively associated therewith. Inlet port 104 is in flow communication with a first chamber 136, and outlet port 108 is in flow communication with a second chamber 140. First chamber 136 is connected to second chamber 140 by a first air flow path having a known air flow restriction member 138 disposed therein. Inlet port 104 is thus in continuous flow communication with outlet port 108.

The second chamber 140 is connected to vent port 112 by a second flow path having another known air flow restriction member 142 disposed therein. Vent port 112 is therefore also in continuous flow communication with outlet port 108. It can thus be appreciated that outlet port 108 is in continuous flow communication with inlet port 104 and vent port 112 regardless of the effect of either of the air flow switches 132 and 134.

A third chamber 148 is connected to the second chamber 140 by a third flow path having yet another known air flow restriction member 150 disposed therein. Third chamber 148 is controllably isolated from first chamber 136 by air flow switch 132. Switch 132 includes a sealing member 144 which forms an airtight seal against surface 146 of body 130 to thereby isolate third chamber 148 from first chamber 136. Preferably, switch 132 isolates third chamber 148 from first chamber 136 via sealing member 144 in its deenergized, or "default", state although the present invention contemplates that switch 132 may conversely isolate third chamber 148 from first chamber 136 in its energized state. In its opposite state, preferably its energized state, switch 132 retracts sealing member 144 from surface 146 to thereby establish flow communication between first chamber 136 and third chamber 148. Switch 132 is preferably responsive to a high level signal at electrical input 120, to energize switch 132 and to a low level signal at electrical input 120, to deenergize switch 132, although the present invention contemplates that switch 132 may be configured for opposite operation.

A fourth chamber 156 is connected to the vent port 112 by a fourth flow path having still another known air flow restriction member 158 disposed therein. Fourth chamber 156 is controllably isolated from second chamber 140 by air flow switch 134. Switch 134 includes a sealing member 152 which forms an airtight seal against surface 154 of body 130 to thereby isolate fourth chamber 156 from second chamber 140. As with switch 132, switch 134 preferably isolates fourth chamber 156 from second chamber 140 via sealing member 152 in its deenergized, or "default", state although the present invention contemplates that switch 134 may conversely isolate fourth chamber 156 from second chamber 140 in its energized state. In its opposite state, preferably its energized state, switch 134 retracts sealing member 152 from surface 154 to thereby establish flow communication between second chamber 140 and fourth chamber 156. Further, as with switch 132, switch 134 is preferably responsive to a high level signal at electrical input 1202 to energize switch 134 and to a low level signal at electrical input 1202 to deenergize switch 134, although the present invention contemplates that switch 134 may be configured for opposite operation. Preferably, switches 132 and 134 are electrical solenoid controlled valves of the type which are typically used in the automotive industry as fuel shutoff valves, although the present invention contemplates that switches 132 and 134 may be any known air flow control switches.

Figure 4:
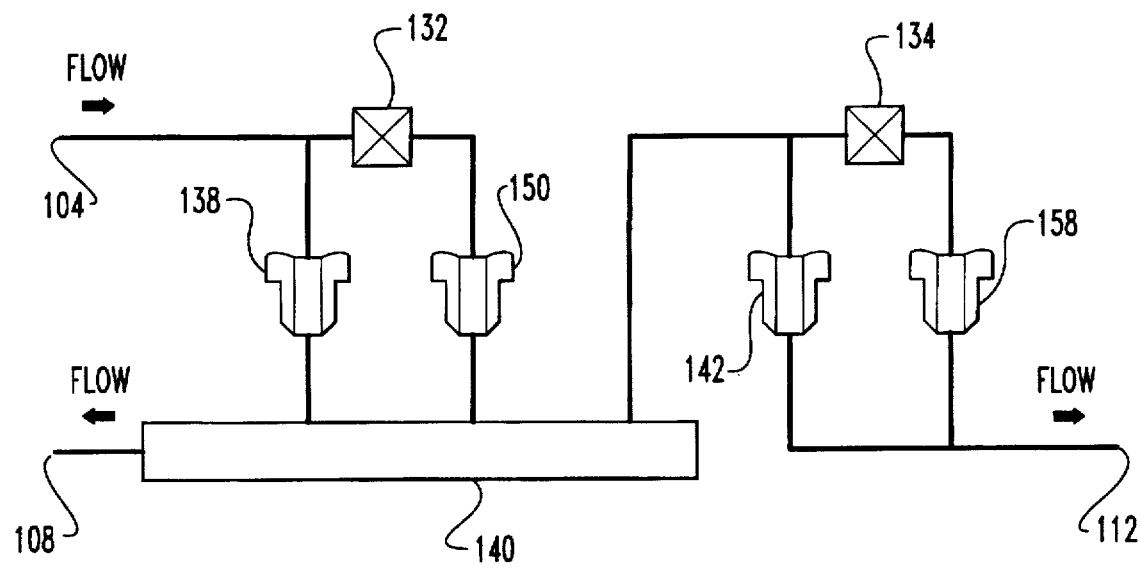
FIG. 4 is a schematic air flow diagram of the air flow control device of FIG. 3.

Referring to FIGS. 3 and 4, the various operational modes of air flow control device 102 will now be described in detail. In a first mode of operation, switches 132 and 134 are deenergized so that first chamber 136 is isolated from third chamber 148 and second chamber 140 is isolated from fourth chamber 156, and boost air flowing into inlet port 104 is directed by flow restriction member 138 to second chamber 140 to define a first air pressure thereat. A portion of the first air pressure within second chamber 140 is directed by air flow restriction member 142 to vent port 112, which is in flow communication with the atmosphere surrounding device 102, to thereby define a resulting wastegate air pressure within second chamber 140 which is provided at outlet port 108. In this first "default" mode of operation, the wastegate air pressure within second chamber 140 is thus defined as the portion of boost air pressure provided by flow restriction member 138 via inlet port 104 minus the portion of first air pressure directed to vent port 112 via flow restriction member 142 and vented to atmosphere.

In a second mode of operation of air flow control device 102, switch 132 is deenergized and switch 134 is energized so that second chamber 140 is in flow communication with fourth chamber 156 and first chamber 136 is isolated from third chamber 148. As compared to the first mode of operation, an additional amount of first air pressure within second chamber 140 is thus directed by air flow restriction member 158 to vent port 112, so that the resulting wastegate air pressure within second chamber 140 is defined as the portion of boost air pressure provided by flow restriction member 138 via inlet port 104 minus the sum of the portions of first air pressure vented to atmosphere via flow restriction members 142 and 158. In the second mode of operation, the wastegate air pressure provided at outlet port 108 is thus correspondingly less than in the first mode of operation.

In a third mode of operation of air flow control device 102, switches 132 and 134 are both energized so that first chamber 136 and third chamber 148, and second chamber 140 and fourth chamber 156, are respectively in flow communication. As compared to the first and second modes of operation, an additional portion of boost air pressure is thus provided to second chamber 140 from inlet port 104 via flow restriction member 150, so that the resulting first air pressure therein is correspondingly increased. The wastegate air pressure within second chamber 140 and provided at outlet 108 is thus defined as the sum of the portions of boost air pressure provided by flow restriction members 138 and 150 via inlet port 104 minus the sum of the portions of first air pressure vented to atmosphere via flow restriction members 142 and 158. In the third mode of operation, the wastegate air pressure provided at outlet port 108 is preferably higher than in either of the first and second modes of operation.

In a fourth mode of operation of air flow control device 102, switch 132 is energized and switch 134 is deenergized so that first chamber 136 and third chamber 148 are in flow communication while second chamber 140 is isolated from fourth chamber 156. As compared to the third mode of operation, a lesser portion of first air pressure is vented from second chamber 140 so that the resulting wastegate air pressure within second chamber 140 is defined as the sum of the portions of boost air pressure provided by flow restriction members 138 and 150 via inlet port 104 minus the portion of first air pressure directed to vent port 112 via flow restriction member 142. In the forth mode of operation, the wastegate air pressure provided at outlet port 108 is thus higher than in any of the previously described three modes of operation.

Figure 5:
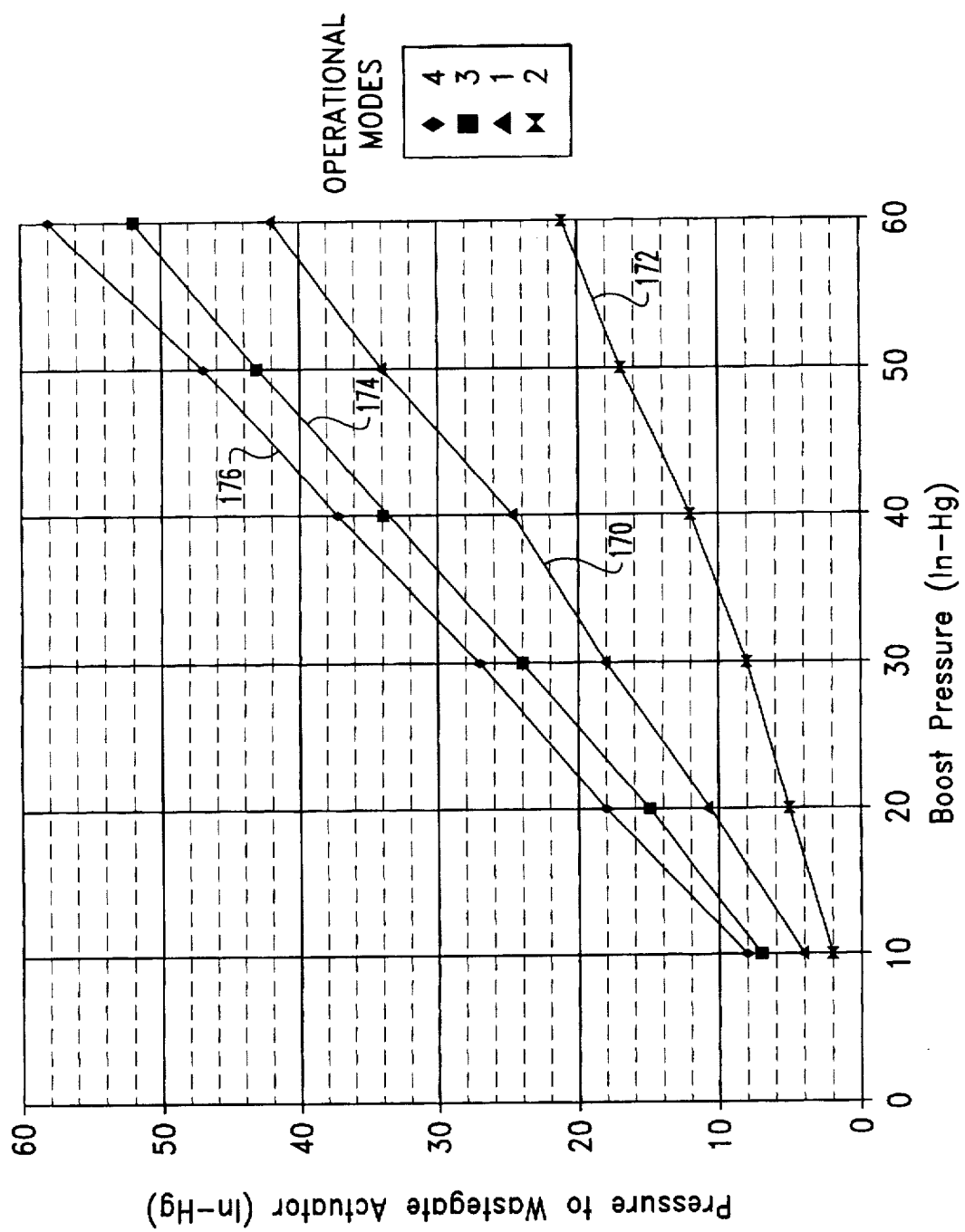
FIG. 5 is a plot of pressure provided to the wastegate actuator by the air flow control device of FIG. 3 versus turbocharger boost pressure provided thereto for four separate operational modes as used in the control system of FIG. 2.

Referring now to FIG. 5, a plot of wastegate air pressure versus boost air pressure (alternatively, the air pressure at outlet port 108 versus the air pressure at inlet port 104 of device 102) is shown which illustrates the four described operational modes of air pressure control device 102 within the control system 100 of FIG. 2. In the first, or "default" mode of operation, wastegate air pressure 170 increases approximately linearly from a low pressure of approximately 4 In-Hg at a boost pressure of 10 In-Hg to a high pressure of approximately 42 In-Hg at a boost pressure of 60 In-Hg. In the second mode of operation, wastegate air pressure 172 increases approximately linearly from a low pressure of approximately 2 In-Hg at a boost pressure of 10 In-Hg to a high pressure of approximately 21 In-Hg at a boost pressure of 60 In-Hg. In the third mode of operation, wastegate air pressure 174 increases approximately linearly from a low pressure of approximately 7 In-Hg at a boost pressure of 10 In-Hg to a high pressure of approximately 52 In-Hg at a boost pressure of 60 In-Hg. Finally, in the fourth mode of operation, wastegate air pressure 176 increases approximately linearly from a low pressure of approximately 8 In-Hg at a boost pressure of 10 In-Hg to a high pressure of approximately 58 In-Hg at a boost pressure of 60 In-Hg.

It should now be appreciated that the air pressure control device 102 of the present invention provides four discrete wastegate air pressure settings for any given boost air pressure. Those skilled in the art will recognize that air pressure control device 102 may be provided with any number of chambers and corresponding air flow switches so that any desired number of discrete wastegate air pressure settings, having any desired slope, can be achieved without detracting from the teachings of the present invention.

Moreover, it is to be understood that the "default" wastegate air pressure setting is preferably set somewhere between the low and high pressure settings of device 102, although the present invention contemplates that the default setting may be any one of the available pressure settings of device 102.

Figure 6:
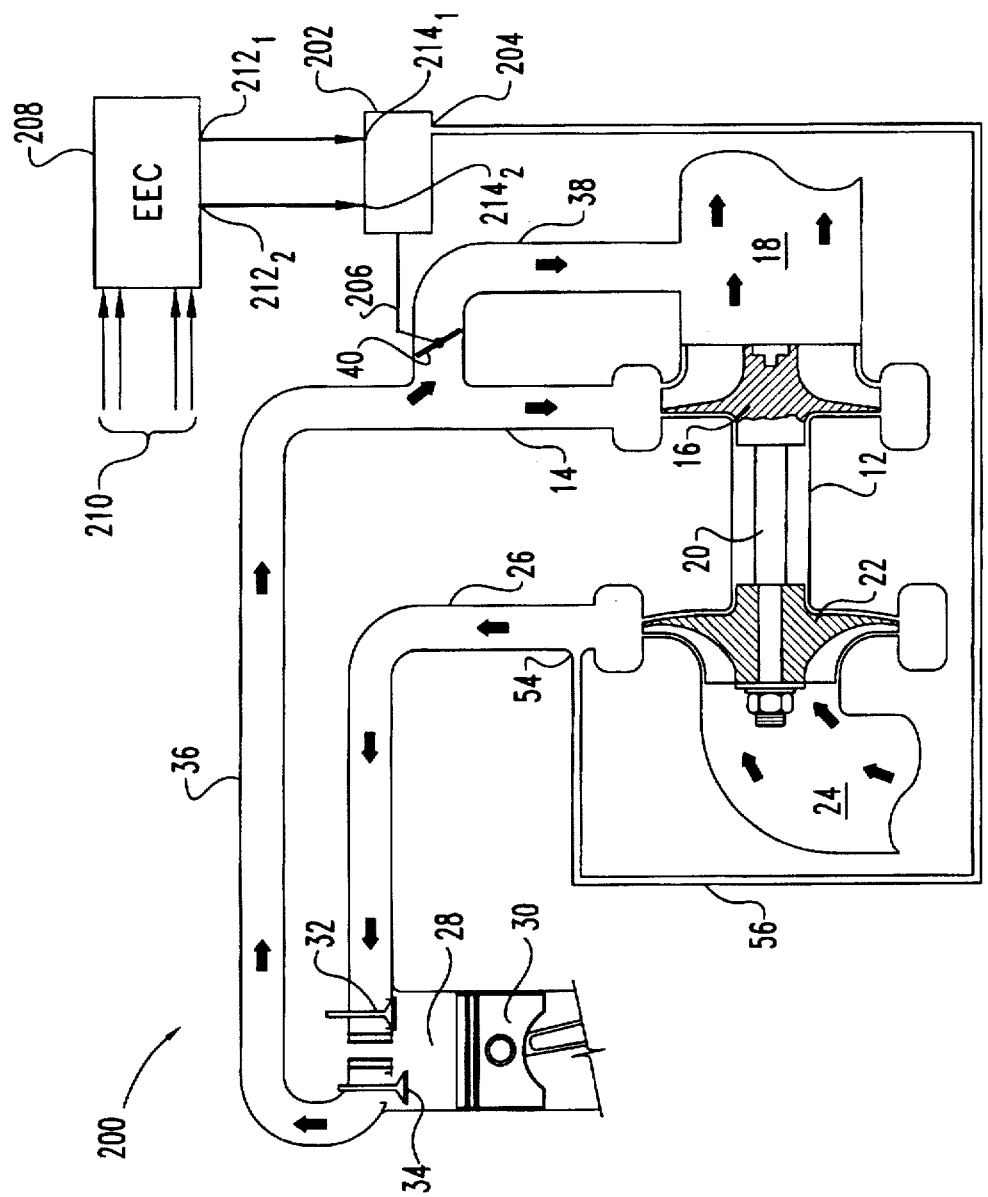
FIG. 6 is a diagrammatic illustration of an engine with a turbocharger and an alternate embodiment of a corresponding bypass exhaust flow control system.

Referring now to FIG. 6, an alternate embodiment of an internal combustion engine turbocharging system 200, in accordance with another aspect of the present invention, is shown. System 200 is identical in many respects to system 100 described with respect to FIG. 2, and like numbers are therefore used to identify like elements. However, system 200 replaces air pressure control device 102 and wastegate actuator 42 with a controllable wastegate actuator 202. Wastegate actuator 202 includes an air pressure input port 204 fluidly connected to orifice 54 of via conduit 56, and a plunger 206 extending therefrom into operable connection with wastegate valve 40. An EEC 208, including all of the features described with respect to EEC 114, receives vehicle and engine operating data via a plurality of data inputs 210, and provides a control signal corresponding thereto at outputs $212_1$ and $212_2$. Wastegate actuator 202 further includes corresponding electrical signal inputs $214_1$ and $214_2$ connected to outputs $212_1$ and $212_1$, and is responsive to such the control signal provided thereat to actuate wastegate valve 40 in a manner to be described hereinafter.

Figure 7:
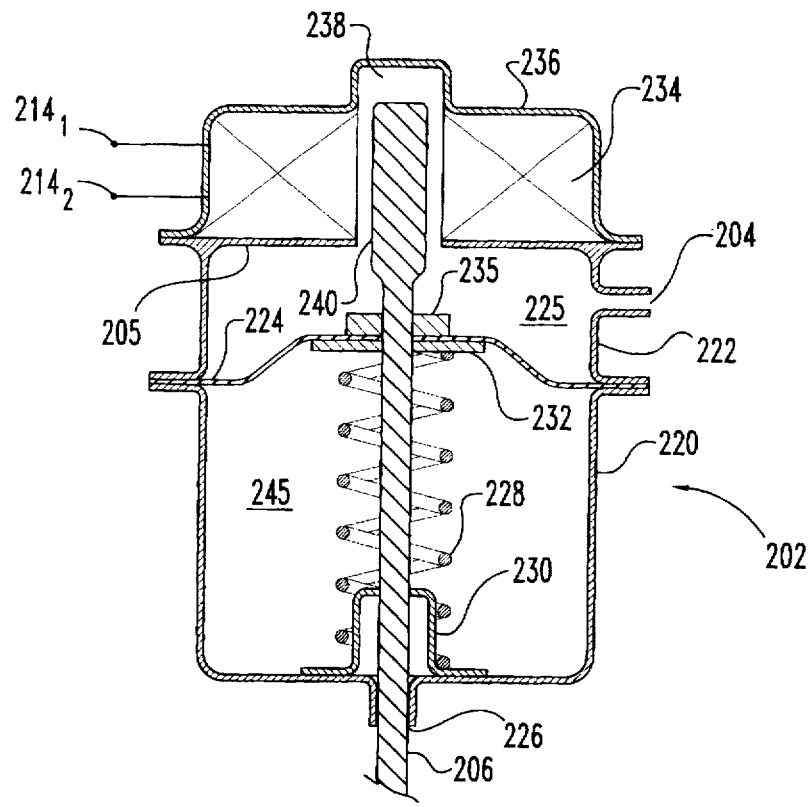
FIG. 7 is a cross-sectional view of one embodiment of a wastegate actuator for use in controlling the wastegate valve in the control system of FIG. 6.

Referring now to FIG. 7, a preferred embodiment of controllable wastegate actuator 202 is shown in accordance with yet another aspect of the present invention. Actuator 202 includes a lower housing 220 and an upper housing 222 separated by pressure sensitive member 224. Preferably, pressure sensitive member 224 is a diaphragm or other flexible member, although the present invention contemplates that pressure sensitive member 224 may be a piston or similar member slidably disposed within and between housings 220 and 222.

Lower housing 220 includes an open orifice 226 in one end thereof having plunger 206 slidably disposed therein. Adjacent an underside of pressure sensitive member 224, a plate, or washer, 232 is attached to plunger 206. A securing member 235 is attached to plunger 206 adjacent the top side of pressure sensitive member 224 and is preferably adjustable to thereby permit pressure sensitive member 224 to be pressed between securing member 235 and washer 232 in an air tight relationship.

A retaining member 230 is disposed over orifice 226 and includes a bore therethrough which slidably receives plunger 206. A resilient member 228 is disposed between retaining member 230 and washer 230 and is operable to bias pressure sensitive member 224 away from retaining member 230. Preferably, resilient member 228 is a coiled spring as shown in FIG. 7, although the present invention contemplates providing resilient member 228 as any known structure operable to bias pressure sensitive member 224 away from retaining member 230 with a predetermined linear or non-linear force.

Upper housing 222 includes an upper wall 205 having a bore define therethrough. A top cap 236 having a receptacle 238 defined therein is attached atop upper wall 205 in air tight relationship. An extension 240 of plunger 206 extends into receptacle 238 of top cap 236, and an electrical coil 234 is positioned between upper wall 205 and top cap 236 surrounding extension 240 of plunger 206. Electrical signal inputs $214_1$ and $214_2$ extend through top cap 236 and are operatively connected to coil 234. Preferably, extension 240 is formed of a known magnetic material so that a coil control signal applied to coil 234 via electrical signal lines $214_1$ and $214_2$ causes plunger 206 to move accordingly either toward or away from retaining member 230 depending upon the polarity of the coil control signal.

Pressure sensitive member 224, upper housing 222 and top cap 236 define a first chamber 225 therebetween which, in the system 200 of FIG. 6, is maintained at boost pressure due to the connection of inlet port 204 to orifice 54 via conduit 56. Pressure sensitive member 224 and lower housing 220 define a second chamber 245 therebetween which is maintained at the pressure of the atmosphere surrounding wastegate actuator 202 due to open port 226.

When coil 234 is deenergized (preferably corresponding to no, or a low level, signal on electrical signal lines $214_1$ and $214_2$) wastegate actuator 202 operates identically to wastegate actuator 42 shown in FIG. 1 and described with respect thereto. However, in accordance with the present invention, a coil control signal supplied to electrical signal lines $214_1$ and $214_2$ by EEC 208 energizes coil 234, resulting in further movement of plunger 206 either toward or away from retaining member 230 in proportion to the strength of the coil control signal.

Figure 8:
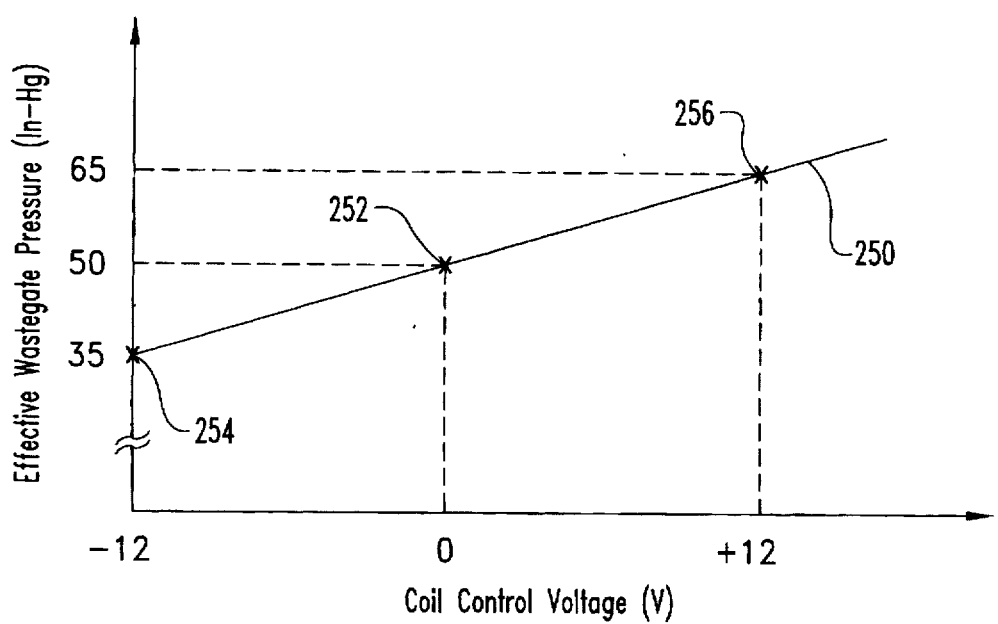
FIG. 8 is a plot of effective pressure provided to the wastegate actuator of FIG. 7 versus coil control voltage supplied thereto as used in the control system of FIG. 6.

Referring now to FIG. 8, an example of the operation of wastegate actuator 202 in the system 200 of FIG. 6 is shown graphically. Effective wastegate pressure versus coil control voltage 250 is shown for coil control voltages of between 31 12 volts and 12 volts. As shown by data point 252, the effective wastegate pressure at zero coil control voltage is approximately 50 In-Hg. It is to be understood that with no coil control voltage, the "effective" wastegate pressure 252 of 50 In-Hg corresponds to the actual boost pressure within first chamber 225.

As increasingly negative coil control voltages are applied to coil 234, the corresponding magnetic forces developed between coil 234 and extension 240 of plunger 206 cause plunger 206 to move in a direction away from retaining member 230. The foregoing effect of the energized coil 234 on extension 240 of plunger 206 acts to alter the biasing force of resilient member 228 and thereby alter the "effective" pressure of boost pressure within first chamber 225. Thus, for a coil control voltage of −12 volts, the plunger 206 is forced by magnetic action to a position corresponding to a boost pressure within first chamber 225 of approximately 35 In-Hg, even though the actual boost pressure within first chamber 225 is approximately 50 In-Hg.

Similarly, as increasingly positive coil control voltages are applied to coil 234, the corresponding magnetic forces developed between coil 234 and extension 240 of plunger 206 cause plunger 206 to move in a direction toward retaining member 230. The foregoing effect of the energized coil 234 on extension 240 of plunger 206 acts to alter the biasing force of resilient member 228 and thereby alter the "effective" pressure of boost pressure within first chamber 225 such that for a coil control voltage of 12 volts, the plunger 206 is forced by magnetic action to a position corresponding to a boost pressure within first chamber 225 of approximately 65 In-Hg, even though the actual boost pressure within first chamber 225 is approximately 50 In-Hg.

With the concepts of the present invention, the ability to choose from -Z plurality of wastegate air pressure settings provides for added control over the known turbocharging system 10 of FIG. 1. Specifically, if EEC 114 is provided with, or can calculate or otherwise estimate, data relating to the temperature of exhaust in exhaust inlet 14 and the rotational speed of turbocharger 12, the wastegate air pressure setting can be modified accordingly to enhance engine performance and vehicle operation. In particular, engine efficiency and emissions as well as engine braking power can be improved while reducing heat emissions, engine braking noise and turbocharger stress. Since control of the various wastegate pressure settings is carried out by EEC 114, the vehicle operator need not alter driving style or driving habits in order to realize the foregoing benefits.

The present invention is illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An apparatus for controlling turbocharging pressure of a turbocharger connected to an internal combustion engine and having an air outlet connected to an intake manifold of the engine, an exhaust gas inlet and an exhaust gas outlet, the apparatus comprising:

an exhaust gas bypass conduit connecting the exhaust gas inlet to the exhaust gas outlet;

a flow control member disposed within said exhaust gas bypass conduit, said flow control member actuatable to thereby control exhaust gas flow through said exhaust gas bypass conduit;

an air pressure control device having an air intake port in flow communication with the intake manifold and an air outlet port, said air pressure control device defining a plurality of air flow paths between said air intake port and said air outlet port wherein at least one of said plurality of air flow paths provides continuous air flow therethrough to said air outlet port, and at least another of said plurality of air flow paths includes therein means for controlling air flow therethrough to said air outlet port; and a flow control actuator having an air inlet port connected to said air outlet port of said air pressure control device and means for actuating said flow control member according to air pressure provided to said flow control actuator inlet port by said air pressure control device.

2. The apparatus of claim 1 wherein the internal combustion engine forms part of a motor vehicle, further including a vehicle control computer providing a flow control signal;

and wherein said air pressure control device further includes a first air flow switch positioned within said at least another of said air flow paths between said air intake port and said air outlet port, said first air flow switch responsive to a first level of said flow control signal to permit air flow therethrough and to a second level of said flow control signal to inhibit air flow therethrough.

3. The apparatus of claim 1 wherein said air pressure control device further includes a vent port in flow communication with the atmosphere external thereto, said device defining a plurality of air flow paths between said vent port and said air outlet port, at least one of said air flow paths between said vent port and said air outlet port providing for continuous air flow therethrough, and at least another of said air flow paths between said vent port and said air outlet port including means for controlling air flow therethrough.

4. The apparatus of claim 3 wherein the internal combustion engine forms part of a motor vehicle, further including a vehicle control computer providing a flow control signal and a vent control signal;

and wherein said air pressure control device further includes a first air flow switch positioned within said at least another of said air flow paths between said air intake port and said air outlet port and a second air flow switch positioned within said at least another of said air flow paths between said vent port and said air outlet port, said first air flow switch responsive to a first level of said flow control signal to permit air flow therethrough and to a second level of said flow control signal to inhibit air flow therethrough, said second air flow switch responsive to a first level of said vent control signal to permit air flow therethrough and to a second level of said vent control signal to inhibit air flow therethrough.

5. The apparatus of claim 4 wherein each of said plurality of air flow paths between said air intake port and said air outlet port and between said vent port and said air outlet port include an air flow restriction member operable to restrict air flow therethrough.

6. An apparatus for controlling turbocharging pressure of a turbocharger connected to an internal combustion engine and having an air outlet connected to an intake manifold of the engine, an exhaust gas inlet and an exhaust gas outlet, the apparatus comprising:

an exhaust gas bypass conduit connecting the exhaust gas inlet to the exhaust gas outlet;

a flow control member positioned within said exhaust bypass conduit for controlling exhaust gas flow therethrough;

means for producing a number of control signals;

means responsive to predefined states of said number of control signals for producing corresponding ones of a number of discrete air pressure levels, each of said number of discrete air pressure levels being a predefined function of air pressure within the intake manifold; and a flow control actuator responsive to any of said number of discrete air pressure levels to accordingly actuate said flow control member.

7. The apparatus of claim 6 wherein said flow control member is a turbocharger wastegate valve.

8. The apparatus of claim 7 wherein said flow control actuator is a wastegate valve actuator.

9. An air flow control device for use with an internal combustion engine having an intake manifold connected to a turbocharging system having a wastegate actuator responsive to air pressure to control a wastegate air flow control member, the device comprising:

a first chamber in flow communication with the intake manifold;

a second chamber in flow communication with the wastegate actuator;

a first air flow path providing for continuous flow communication between said first and second chambers;

a third chamber in flow communication with said first chamber and defining a second flow path therefrom to said second chamber; and means for controllably isolating said third chamber from said first chamber to thereby controllably alter air pressure in said second chamber.

10. The device of claim 9 wherein first air flow path includes a flow restriction member operable to restrict air flow therethrough.

11. The device of claim 9 wherein said means for controllably isolating said third chamber from said first chamber includes a first air flow control switch responsive to a first level of a control signal to permit flow communication between said first and third chambers, and to a second level of a control signal to isolate said third chamber from said first chamber.

12. The device of claim 11 wherein said first and second air flow paths each include a flow restriction member operable to restrict air flow therethrough.

13. The device of claim 9 further including:

a vent outlet; and a third air flow path providing for continuous flow communication between said second chamber and said vent outlet.

14. The device of claim 13 wherein said third air flow path includes a flow restriction member operable to restrict air flow therethrough.

15. The device of claim 13 further including:

a fourth chamber in flow communication with said second chamber and defining a fourth flow path therefrom to said vent outlet; and means for controllably isolating said fourth chamber from said second chamber to thereby further controllably alter air pressure in said second chamber.

16. The device of claim 15 wherein said means for controllably isolating said fourth chamber from said vent outlet includes a second air flow control switch responsive to a first level of a control signal to permit flow communication between said second and fourth chambers, and to a second level of a control signal to isolate said second chamber from said fourth chamber.

17. The device of claim 16 wherein said third and fourth air flow paths each include a flow restriction member operable to restrict air flow therethrough.

18. The device of claim 16 wherein said first and second air flow control switches are electronically controlled valves.

* * * * *

UNITED STATES PATENT AND TRADEMARK OFFICE
CERTIFICATE OF CORRECTION

PATENT NO. : 5,755,101
DATED : May 26, 1998
INVENTOR(S) : Paul Douglas Free, et al.

It is certified that error appears in the above-identified patent and that said Letters Patent is hereby corrected as shown below:

In Col. 2, at line 46, delete "inlet" after "manifold".

In Col. 6, at line 8, delete "120, and 1202" and replace it with -- $120_1$ and $120_2$ --.

In Col. 6, at line 40, delete "120." and replace it with -- $120_1$ --.

In Col. 6, at line 41, delete "120." And replace it with -- $120_1$ --.

In Col. 6, at line 61, delete "1202" and replace it with -- $120_2$ --.

In Col. 6, at line 62, delete "1202" and replace it with -- $120_2$ --.

In Col. 8, at line 57, replace the second instance of "$212_1$" with -- $212_2$ --.

UNITED STATES PATENT AND TRADEMARK OFFICE
CERTIFICATE OF CORRECTION

PATENT NO. : 5,755,101
DATED : May 26, 1998
INVENTOR(S) : Paul Douglas Free, et al.

It is certified that error appears in the above-identified patent and that said Letters Patent is hereby corrected as shown below:

In Col. 9, at line 58, delete "31".

In Col. 9, at line 59, replace the first instance of "12" with -- -12 -- .

In Col. 10, at line 27, replace "-Z" with -- a --.

Signed and Sealed this

Sixteenth Day of March, 1999

Attest:

Q. TODD DICKINSON

Attesting Officer

Acting Commissioner of Patents and Trademarks